US012027788B2

(12) United States Patent
Ilvonen et al.

(10) Patent No.: US 12,027,788 B2
(45) Date of Patent: Jul. 2, 2024

(54) DUAL POLARIZATION CONNECTED ANTENNA ARRAY

(71) Applicant: Huawei Technologies Co., Ltd., Shenzhen (CN)

(72) Inventors: Janne Ilvonen, Helsinki (FI); Alexander Khripkov, Helsinki (FI); Ruiyuan Tian, Helsinki (FI); Jari Kristian Van Wonterghem, Helsinki (FI); Timofey Kamyshev, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 170 days.

(21) Appl. No.: 17/757,679

(22) PCT Filed: Dec. 19, 2019

(86) PCT No.: PCT/EP2019/086447
§ 371 (c)(1),
(2) Date: Jun. 17, 2022

(87) PCT Pub. No.: WO2021/121611
PCT Pub. Date: Jun. 24, 2021

(65) Prior Publication Data
US 2023/0014394 A1 Jan. 19, 2023

(51) Int. Cl.
*H01Q 9/42* (2006.01)
*H01Q 1/24* (2006.01)
(Continued)

(52) U.S. Cl.
CPC ............... *H01Q 9/42* (2013.01); *H01Q 1/243* (2013.01); *H01Q 9/285* (2013.01);
(Continued)

(58) Field of Classification Search
CPC .......... H01Q 1/243; H01Q 9/285; H01Q 9/42; H01Q 21/062; H01Q 21/24; H01Q 21/28
See application file for complete search history.

(56) References Cited

U.S. PATENT DOCUMENTS 9,667,290 B2 5/2017 Ouyang et al.
10,044,110 B2 8/2018 Dong et al.
(Continued)

FOREIGN PATENT DOCUMENTS

CN 115693114 A * 2/2023

OTHER PUBLICATIONS

Awasthi, A, et al., "Ultra-Wideband Tightly Coupled Dipole Phased Array Antenna", IEEE, Sep. 13-16, 2017, 4 Pages.
(Continued)

*Primary Examiner* — Ab Salam Alkassim, Jr.
*Assistant Examiner* — Leah Rosenberg
(74) *Attorney, Agent, or Firm* — Slater Matsil, LLP

(57) ABSTRACT

An antenna assembly includes a first antenna array and at least one second antenna array disposed a substrate. The first antenna array includes a first monopole antenna element and at least a second monopole antenna element. A metal strip member is coupled to the first monopole antenna element and to the second monopole antenna element. The second antenna array comprises a dipole shaped coupler. The first antenna array and the second antenna array are spaced apart by a predetermined distance and occupy a common space.

20 Claims, 11 Drawing Sheets

(51) Int. Cl.
*H01Q 9/28* (2006.01)
*H01Q 21/06* (2006.01)
*H01Q 21/24* (2006.01)
*H01Q 21/28* (2006.01)

(52) U.S. Cl.
CPC ........... *H01Q 21/062* (2013.01); *H01Q 21/24* (2013.01); *H01Q 21/28* (2013.01)

(56) References Cited

U.S. PATENT DOCUMENTS

| | | | | |
|---|---|---|---|---|
| 10,770,793 | B2 * | 9/2020 | Ryoo | H01Q 5/35 |
| 2009/0207092 | A1 * | 8/2009 | Nysen | H01Q 21/28 343/893 |
| 2010/0053022 | A1 | 3/2010 | Mak et al. | |
| 2016/0087348 | A1 | 3/2016 | Ko et al. | |
| 2016/0164186 | A1 | 6/2016 | Ganchrow et al. | |
| 2017/0201011 | A1 | 7/2017 | Khripkov et al. | |
| 2017/0294705 | A1 | 10/2017 | Khripkov et al. | |
| 2018/0026341 | A1 | 1/2018 | Mow et al. | |
| 2019/0165478 | A1 | 5/2019 | Jo et al. | |
| 2019/0229413 | A1 * | 7/2019 | Jong | H01Q 1/422 |
| 2021/0408682 | A1 | 12/2021 | Khripkov et al. | |
| 2022/0336967 | A1 * | 10/2022 | Park | H01Q 9/20 |
| 2023/0223708 | A1 * | 7/2023 | Lee | H01Q 13/085 343/702 |

OTHER PUBLICATIONS

Cavallo, D. "Connected Array Antennas:Analysis and Design", Eindhoven University of Technolody Library, Nov. 2011, 233 Pages.

Cavallo, D., "Connected Arrays of Dipoles for Broad Band, Wide Angle Scanning, Dual Polarized Applications: a Novel Solution to the Common Mode Problem", IEEE, Oct. 12-15, 2010, 5 pages.

Hay, S. et al., "Numerical and Experimental Studies of a Dual-polarized Planar Connected-Array Antenna for the Australian Square Kilometer Array Pathfinder", IEEE, Jun. 1-5, 2009, 4 Pages.

Sharawi, M. et al., "Slot-Based Connected Antenna Arrays for 5G Mobile Terminals", IEEE, Mar. 5-7, 2018, 3 Pages.

* cited by examiner

DUAL POLARIZATION CONNECTED ANTENNA ARRAY

CROSS-REFERENCE TO RELATED APPLICATIONS

This application is a National Stage of International Patent Application No. PCT/EP2019/086447, filed on Dec. 19, 2019, which is hereby incorporated by reference in its entirety.

TECHNICAL FIELD

The aspects of the present disclosure relate generally to mobile communication devices and more particularly to an antenna array for a mobile communication device.

BACKGROUND

More and more radio technologies need to be supported in a mobile device. These technologies may include cellular technologies, such as 2G/3G/4G radio, as well as non-cellular technologies. In the coming 5G new radio (NR) technology, the frequency range will be expanded from sub-6 GHz to the so-called mmWave frequency, e.g., 24 GHz, 28 GHz, 39 GHz and 42 GHz. In mmWave frequency, the antenna array will be used to form beams with higher gain to overcome higher path loss in the propagation media. However, antenna radiation patterns and array beam patterns with higher gain will result in a narrow beam width. Beam steering techniques such as phased antenna array can be utilized to steer the beam towards different direction on demand. However, when it comes to user equipment (UE) such as a mobile terminal, the UE may be used in an arbitrary orientation. Thus, the UE antenna design must exhibit a very wide nearly full spherical beam coverage.

One challenge to implement mmWave antennas for a UE device is to have omnicoverage radiation properties, where mmWave energy is radiated from the sides of the UE device to achieve full spherical coverage. The conventional technique to achieve display side radiation is to locate mmWave antenna arrays next to the display unit. However, the current design trend is to extend the size of the display so that the display cover the whole front face of the UE. This limits the space available for the antenna(s).

Accordingly, it would be desirable to provide an antenna array that addresses at least some of the problems identified above.

SUMMARY

The aspects of the disclosed embodiments are directed to providing an antenna array for a mobile communication device. This object is solved by the subject matter of the independent claims. Further advantageous modifications can be found in the dependent claims.

According to a first aspect the above and further objects and advantages are obtained by an antenna assembly. In one embodiment, the antenna assembly includes a first antenna array disposed on a first side of a substrate and a second antenna array disposed on the second side of the substrate. The first antenna array is made up of a first monopole antenna element and at least one second monopole antenna element. A metal strip member is coupled to the first monopole antenna element and to the at least one second monopole antenna element. The second antenna array comprises a dipole shaped coupler. The first antenna array and the second antenna array are spaced apart by a predetermined distance and occupy a common space. The aspects of the disclosed embodiments provide an antenna arrangement that is extremely compact since the geometry of two differently polarized antenna arrays is shared between the antennas. Physically smaller antennas are beneficial given the small volumes available for antennas in devices with big displays.

In a possible implementation form of the antenna assembly, the metal strip member couples an end of the first monopole antenna element opposite a feed point of the first monopole antenna element to an end of the at least one second antenna element opposite a feed point of at least one the second antenna element. The aspects of the disclosed embodiments provided improved bandwidth and efficiency of the first monopole antenna element and the second monopole antenna element by a coupled array mode. The electric fields generated by the first monopole antenna element and the second monopole antenna element are uniform and less frequency dependent due to metal strip member coupling.

In a possible implementation form of the antenna assembly the metal strip member is directly connected to the first monopole antenna element and the at least one second monopole antenna element. The connection with the metal strip member makes the arrangement of the first monopole antenna element and the second monopole antenna element physically smaller. The metal strip member is effectively operating as a part of the first monopole antenna element and the second monopole antenna element.

In a possible implementation form of the antenna assembly the metal strip member and the first monopole antenna are separated by a gap. The metal strip member and the at least one second monopole antenna are separated by the gap. In this manner, the metal strip member is capacitively coupled to the first monopole antenna element and the second monopole antenna element. The aspects of the disclosed embodiments enable the first monopole antenna and the second monopole antenna to be physically smaller. The frequency bands of the monopole antennas are tuned by the first gap and the second gap in order to make the antenna assembly smaller in size.

In a possible implementation form of the antenna assembly, the metal strip member is disposed on a third layer of the substrate, wherein the third layer is different from the first layer and the second layer. The aspects of the disclosed embodiments provide for the metal strip to be capacitively coupled, enabling greater design flexibility.

In a possible implementation form of the antenna assembly an alignment of the first monopole antenna and the at least one second monopole antenna on the substrate is orthogonal relative to an alignment of the metal strip member. The dipole-shaped antenna coupler of the second antenna array uses the metal strip member of the first antenna array as an antenna member. This allows the overall size of the antenna assembly to remain small.

In a possible implementation form of the antenna assembly, the pre-determined distance between first antenna array and the second antenna array is less than approximately two millimeters (mm). The antenna assembly can be implemented on a printed circuit board (PCB) and a typical thickness of the PCB is between 0.3 to 2 mm. Coupling with the metal strip member is reduced when the distance increases beyond this range, which can limit the performance of the antenna assembly.

In a possible implementation form of the antenna assembly, a dielectric block is disposed over a top the second antenna array. The frequency of the second antenna array, or the horizontally polarized antenna, can be tuned in order to make the horizontally polarized antenna, such as the dipole shaped antenna coupler, and the antenna assembly smaller in size.

In a possible implementation form of the antenna assembly, the second antenna array comprises a second dipole shaped antenna coupler. The second dipole shaped antenna coupled is tightly coupled with the first dipole shaped antenna coupler. Tightly coupled or connected antenna arrays achieve wideband performance since neighbouring antenna elements allow the current to remain nearly constant over frequency. This enables the size of the antenna assembly to be physically smaller.

In a possible implementation form of the antenna assembly a first branch of the second dipole shaped antenna coupler is connected to a first feeding line and a second branch of the second dipole shaped antenna coupler is connected to a second feeding line. The second dipole antenna coupler is configured to provide balanced feeding where the different feed lines feed signals with the same magnitude and 180 degree phase offset.

In a possible implementation form of the antenna assembly a first branch of the second dipole shaped antenna coupler is connected to a feeding line and a second branch of the second dipole shaped antenna coupler is connected to a ground connection. This enables the second dipole shaped antenna coupler to have unbalanced feeding.

In a possible implementation form of the antenna assembly a polarization of the first antenna array is different from a polarization of the second antenna array. Data throughput is improved by the different polarizations and the multiple input multiple output (MIMO) performance of the antenna assembly.

In a possible implementation form of the antenna assembly the first antenna array is configured as vertically polarized antenna and the second antenna array is configured as a horizontally polarized antenna. Data throughput is improved by the different polarizations and the MIMO performance of the antenna assembly.

According to a second aspect the above and further objects and advantages are obtained by a mobile communication device. In one embodiment, the mobile communication device has a frame member, a display glass member covering a display of the mobile communication device and an antenna assembly according to any one or more of the possible implementation forms.

In a possible implementation form of the mobile communication device the antenna assembly is disposed in a cavity of the frame member between the display glass member and the frame member. The aspects of the disclosed embodiments provide a visually-appealing design of the mobile communication device. The device can include a full-display design with minimal inactive areas on the front surface. The aspects of the disclosed embodiments provide an antenna arrangement that is extremely compact since the geometry of two differently polarized antenna arrays is shared between the two antennas. Physically smaller antennas are beneficial given the small volumes available for antennas in devices with larger or full screen displays.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE ILLUSTRATIVE EMBODIMENTS

Figure 1:
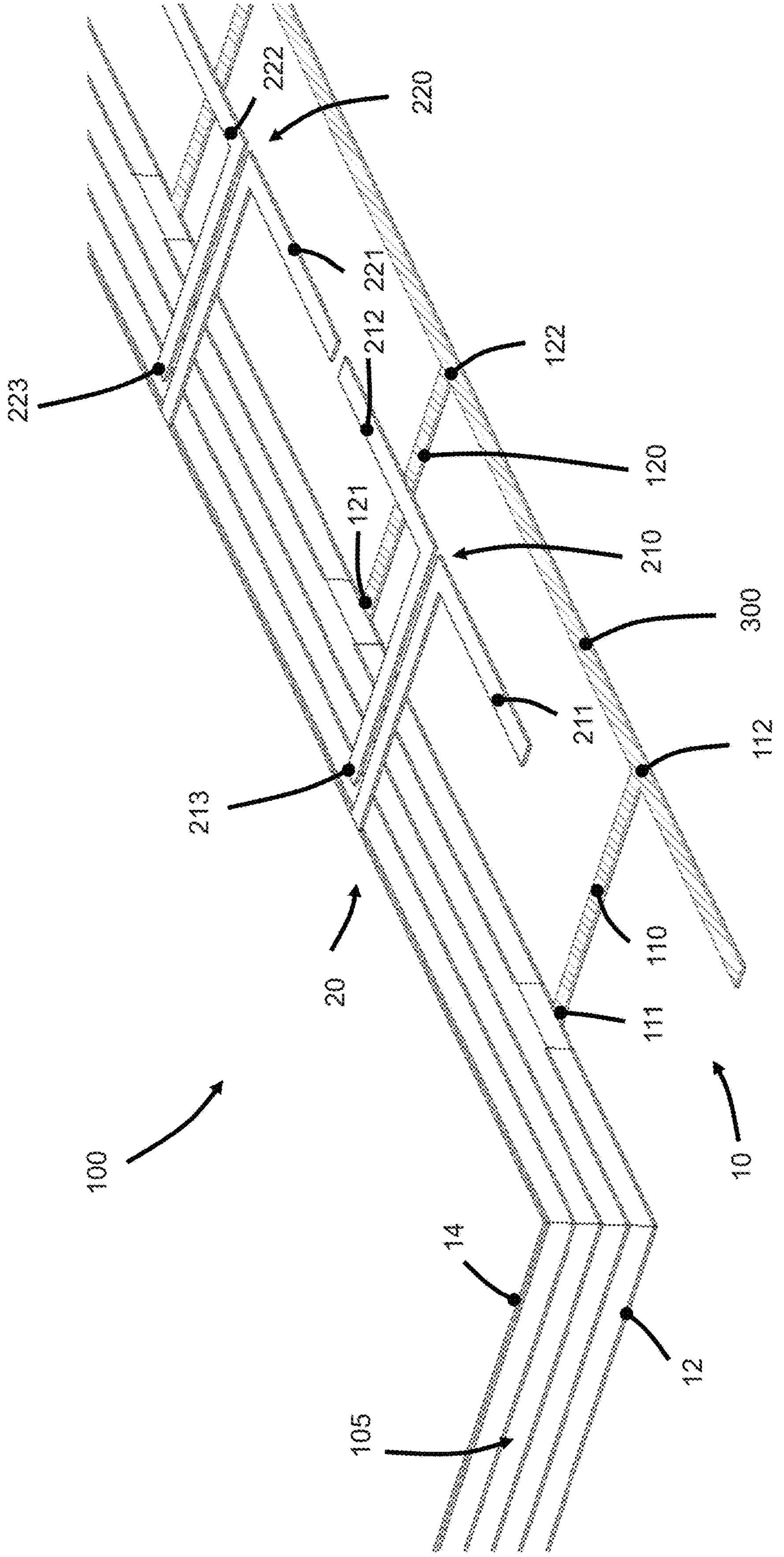
FIG. 1 illustrates a partial schematic block diagram of one embodiment of an exemplary antenna assembly incorporating aspects of the disclosed embodiments.

Referring to FIG. 1, an exemplary antenna assembly 100 incorporating aspects of the disclosed embodiments is illustrated. The aspects of the disclosed embodiments are directed to a compact dual polarization connected antenna array, also referred to as a mmWave multi-mode connected antenna array, with wide beam coverage. The antenna assembly 100 of the disclosed embodiments is extremely compact since the geometry of two differently polarized antenna arrays is shared between the two antennas. Physically smaller antennas are beneficial given the small volumes available for antennas in mobile devices with big displays. The antenna assembly 100 is configured to be integrated into the frame of a mobile device with a full-display, wherein the frame of the mobile device can be made by solid metal. As used herein, the term "full-display" mobile device generally refers to a device with a screen-to-body ratio that is over 80 percent, or a bezel less device.

As shown in the example of FIG. 1, the antenna assembly 100 includes a first antenna array 10 and a second array 20. The first antenna array 10 is disposed on a first side 12 or layer of a substrate 105. The second antenna array 20 is disposed on a second side 14 or layer of the substrate 105. As will be further described herein, the substrate 105 generally comprises a printed circuit board (PCB). The printed circuit board can have any number of layers. In the example of FIG. 1, five layers are illustrated, with the antennas disposed on the bottom and top layers. A typical PCB will have at least two metal layers, a maximum number of layers is limited by the height or thickness of the PCB. Although for the purposes of the description herein, the antenna arrays 10, 20 will be described with respects to bottom and top sides of the substrate 105. However, the aspects of the disclosed embodiments are not so limited. In alternative embodiments, the antenna arrays 10, 20 can be disposed on any suitable layers of the printed circuit board, as will be described further herein.

The first antenna array 10 comprises at least a first monopole antenna or antenna element 110 and at least a second monopole antenna or antenna element 120. As will be generally understood, the antenna assembly 100 can include any number of monopole antenna elements. For example, FIG. 3 illustrates an embodiment where the first antenna array 10 includes eight (8) monopole antenna elements.

In one embodiment, the second antenna array 20 comprises at least one dipole shaped coupler 210. The number of dipole shaped coupler antennas of the second antenna array 20 will correspond to the number of monopole antennas of the first antenna array 10.

Figure 2:
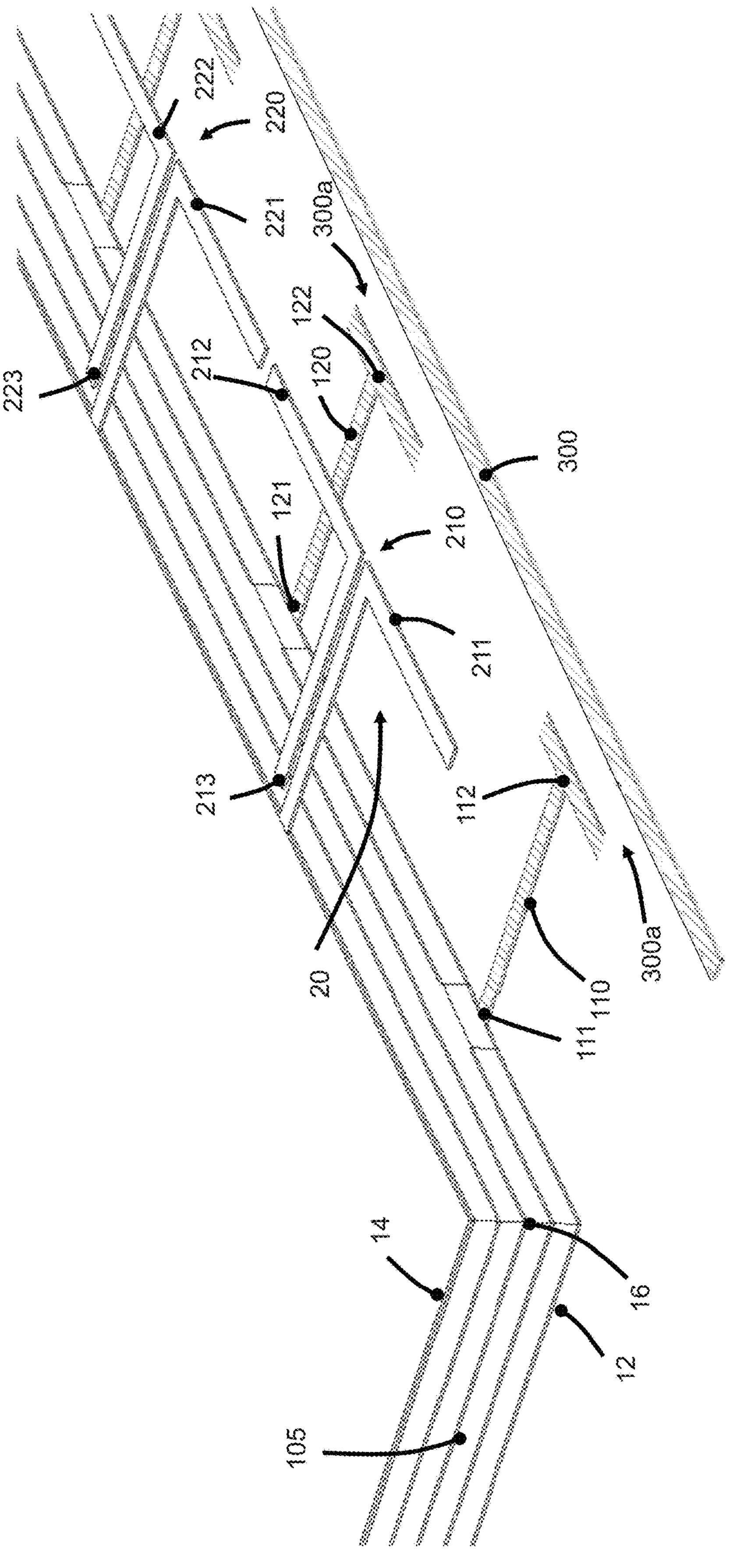
FIG. 2 illustrates a partial schematic block diagram of one embodiment of an exemplary antenna assembly incorporating aspects of the disclosed embodiments.

A metal strip member 300 is coupled to and between the first monopole antenna element 110 and the at least one second monopole antenna element 120. In one embodiment, as shown in FIG. 1, the metal strip member 300 is directly connected to and between the first monopole antenna element 110 and the at least one second monopole antenna element 120 to form an electrically conductive connection. Although the example of FIG. 1 shows a direct connection of the metal strip member 300 to the monopole antenna elements 110, 120, the aspects of the disclosed embodiments are not so limited. In one embodiment, as shown in FIG. 2, the metal strip member 300 can be capacitively coupled to the monopole antenna elements 110, 120 via a capacitive gap 300*a*.

The first antenna array 10 and the second antenna array 20 are spaced apart by a predetermined distance and occupy a common space. In the example of FIG. 1, the predetermined distance is a thickness of the substrate 105. A typical thickness of the substrate 105 can range to and from between approximately 0.3 mm to and including 2 mm. The coupling of the second antenna array 20 with the metal strip member 300 is reduced when the predetermined distance increases beyond this range, which can limit the performance of the antenna assembly 100. In alternative embodiments, the distance between the first antenna array 10 and the second antenna array 20 can be any suitable distance that enables coupling with the metal strip member and does not limit the performance of the antenna assembly.

For the purposes of the description herein, the first antenna array 10 in this example is configured as a vertically polarized antenna array. This vertically polarized antenna array can be either a connected antenna array or a multifeed folded monopole antenna array.

The second antenna array 20 in this example, is configured as a horizontally polarized antenna array with dipole shaped couplers that are tightly coupled. The term "tightly coupled" as used herein generally refers to adjacent ends of elements of different dipole shaped couplers being closely spaced. In one embodiment, the spacing between the ends of the elements of adjacent dipole shaped couplers is less than $\lambda/10$. The geometry of the vertically polarized antenna is shared between both the vertically and horizontally polarized antennas.

In the example of FIG. 1, the first monopole antenna element 110 has a feedpoint 111 and an endpoint 112. The second monopole antenna 120 includes feedpoint 121 and endpoint 122. Generally, each monopole antenna will have a feedpoint and an endpoint. In one embodiment, the endpoint of a monopole antenna comprises a T-shaped endpoint. An example of this is shown in the embodiment of FIG. 2, where endpoints 112 and 122 are in a T-shape form.

Referring also to FIG. 3, the first antenna array 10 is formed by a number of individual monopole antenna elements, generally illustrated as antenna elements 110-180. The monopole antenna elements 110-180 are connected or coupled to each other by the metal strip member 300, and a total of eight (8) feeds 111-181 are used. However, in alternative embodiments the number of individual monopole antenna elements can be anything larger than 1.

In one embodiment, a proper antenna length for the monopole antenna elements is defined such that the electrical length 330 is roughly $\lambda/4$. The physical length of the monopole antenna elements can be reduced with the help of a ceramic block with a proper dielectric constant (Dk). In this design, a Dk of 20 is used but suitable values are between 3 and 40.

Figure 3A:
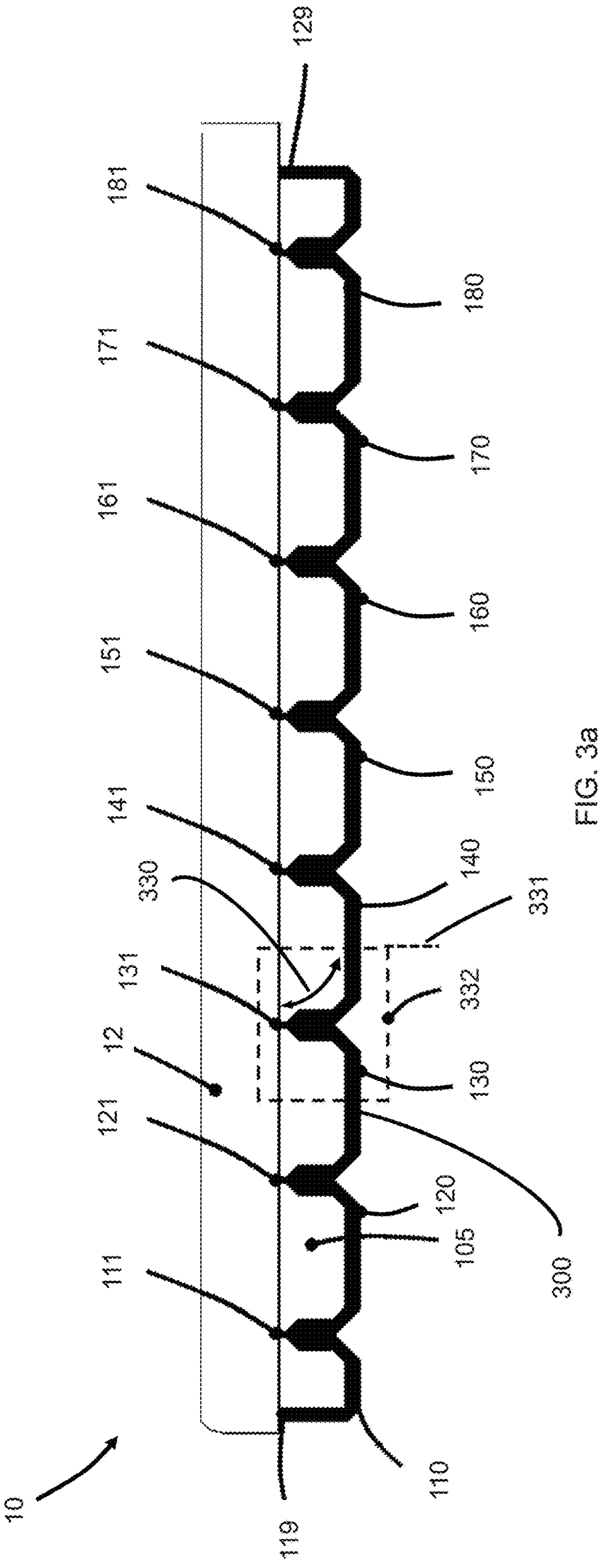
FIGS. 3*a* and 3*b* illustrates schematic top side diagrams of embodiments of a monopole antenna array for an exemplary antenna assembly incorporating aspects of the disclosed embodiments.
Figure 3B:
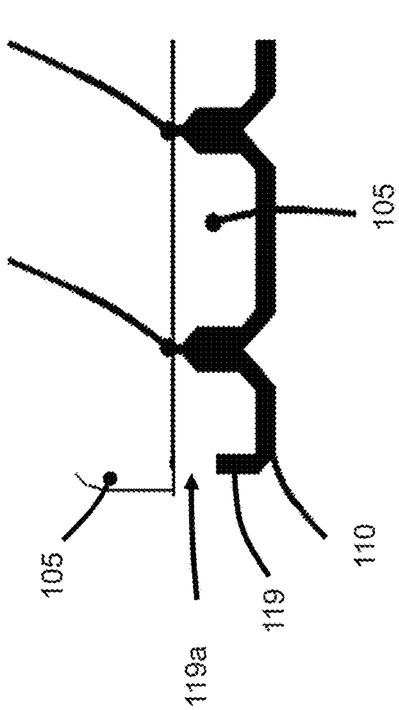

In one embodiment, a dummy antenna branch 119 is disposed at one end of the antenna array 10 and a dummy antenna branch 129 is disposed at the other end of the antenna array 10. The dummy antenna branches 119, 129 are used to mimic a continuation of the antenna array 10. The dummy antenna branches 119, 129 may be directly, electrically or inductively connected to PCB 105 as shown in FIG. 3*a* or capacitively coupled by providing a capacitive gap 119*a* between the PCB 105 and the dummy antenna 119 and 129 as illustrated in FIG. 3*b*. A direct connection increases the antenna impedance more as compared to the use of the gap 119*a*.

As shown in FIGS. 1 and 3, the metal strip member 300 is connected to and connects the monopole antennas 110-180. As shown in FIG. 1, the metal strip member 300, which can comprise any suitable type of electrically conducting element, couples end 112 of the first monopole antenna element 110, which is opposite the feed point 111, to the end 122 of the second antenna element 120, opposite the feed point 121.

In the example of FIG. 2, the monopole antenna elements 110, 120 are T-shaped, forming capacitively loaded monopole antenna elements. A gap 300*a*, referred to as a capacitive gap, separates the ends 112, 122 of the respective monopole antenna elements 110, 120 from the metal strip member 300. In this example, the metal strip member 300 is capacitively coupled to the respective monopole antenna elements 110, 120. When a capacitive gap is introduced as shown in FIG. 2, the metal strip member is floating, i.e., there is no galvanic connection.

The metal strip member 300 can be located on the same layer as the first or monopole antenna array 10 as shown in FIG. 1 or 2 or any other layer between the monopole antenna array 10 and the second antenna array 20. For example, in one embodiment, the metal strip member 300 can be disposed on a layer of the substrate 105 that is between the layer 12 and the layer 14. Where the metal strip member 300 is located on a layer of the substrate that is not one of the layers 12 or 14, there will also be a vertically oriented or disposed gap between the metal strip member 300 and one or more of the first antenna array 10 and the second antenna array in addition to the horizontally oriented gap 300*a*. The size of this vertically oriented gap will be the distance between the particular layer of the substrate 105 and the location of the respective antenna array 10, 20.

Figure 4:
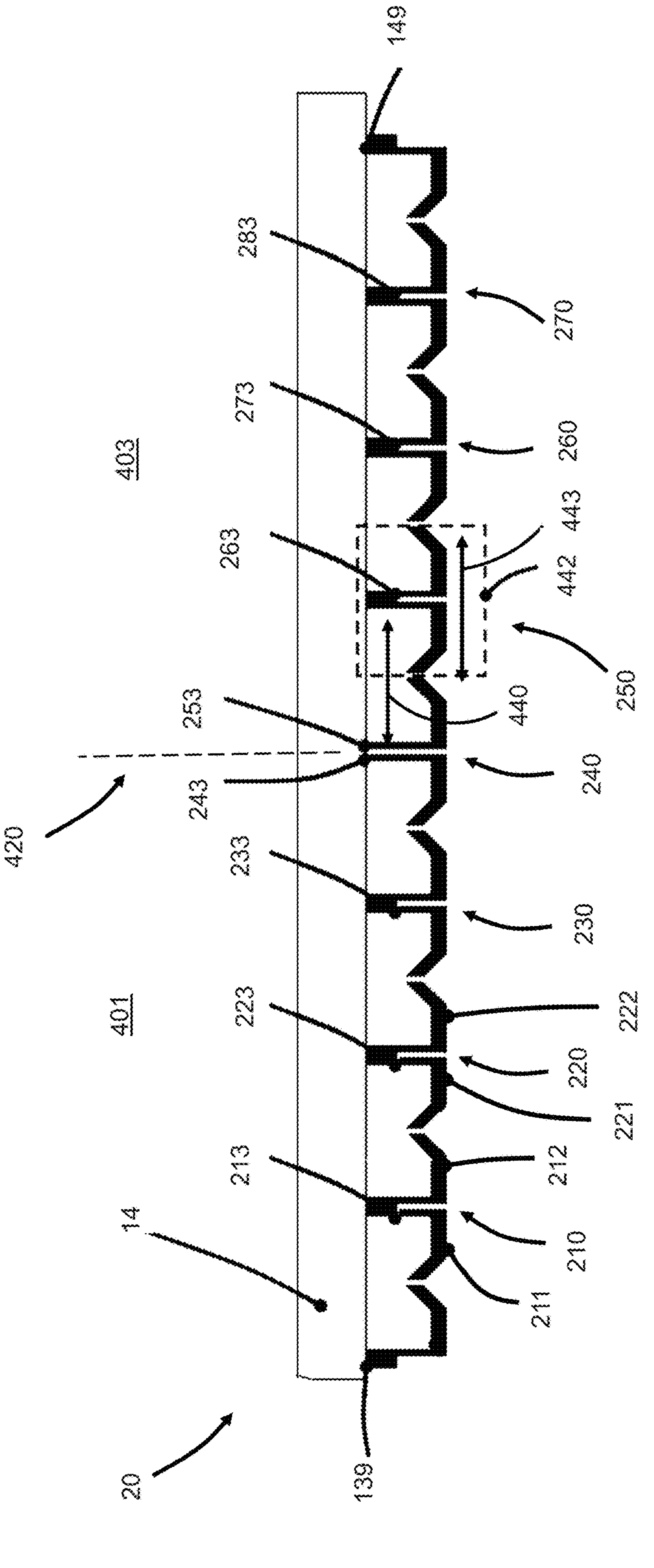
FIG. 4 illustrates a schematic top side diagram of one embodiment of a dipole shaped coupler antenna array and an antenna feeding structure for an exemplary antenna assembly incorporating aspects of the disclosed embodiments.

Referring to FIG. 4, a schematic diagram of the second antenna array 20 is illustrated, wherein the second antenna array 20 is disposed on the second side 14 of the substrate 105, or a side of the substrate 105 opposing the first antenna array 10. Also referring to FIG. 1, the second antenna array 20 comprises a dipole shaped coupler 210 and at least one other dipole shaped coupler 220. FIG. 4 illustrates an example of the second or dipole shaped coupler antenna array 20 that includes eight dipole shaped coupler elements 210-280. As will be generally understood, the second antenna array 20 can include any suitable number of dipole shaped couplers. The number of dipole-shaped coupler elements of the second antenna array 20 has to be the same as the number of monopole antenna elements of the first antenna array 10.

As shown in FIG. 4, a spacing 440 between adjacent dipole-shaped coupler elements and a length 443 of an exemplary dipole-shaped coupler element 442 is roughly $\lambda/2$. The physical dimensions of the dipole shaped coupler elements can depend on the dielectric material(s) that are used.

Referring again to FIGS. 1 and 4, the first dipole shaped coupler 210 includes a first dipole element 211, a second dipole element 212, and a feed point 213. The at least one other dipole shaped coupler 220 includes a first dipole element 221, a second dipole element 222 and a feed point 223. The dipole-shaped couplers in FIGS. 1 and 4 are tightly coupled in order to create a full wave loop type current distribution.

As shown in FIG. 4, the second antenna array 20 includes a dummy antenna branch 139 at one end of the antenna array 20 and a dummy antenna branch 149 at the other end of the antenna array 20. The dummy branches 139, 149 are used to mimic a continuation of the antenna array 20. The dummy antenna branches 139, 149 may be inductively connected to PCB 105 as shown in FIG. 4 or capacitively coupled by providing a capacitive gap 119*a* between the PCB 105 and the dummy antenna 139 and 149 as shown in FIG. 3*b*.

Figure 9:
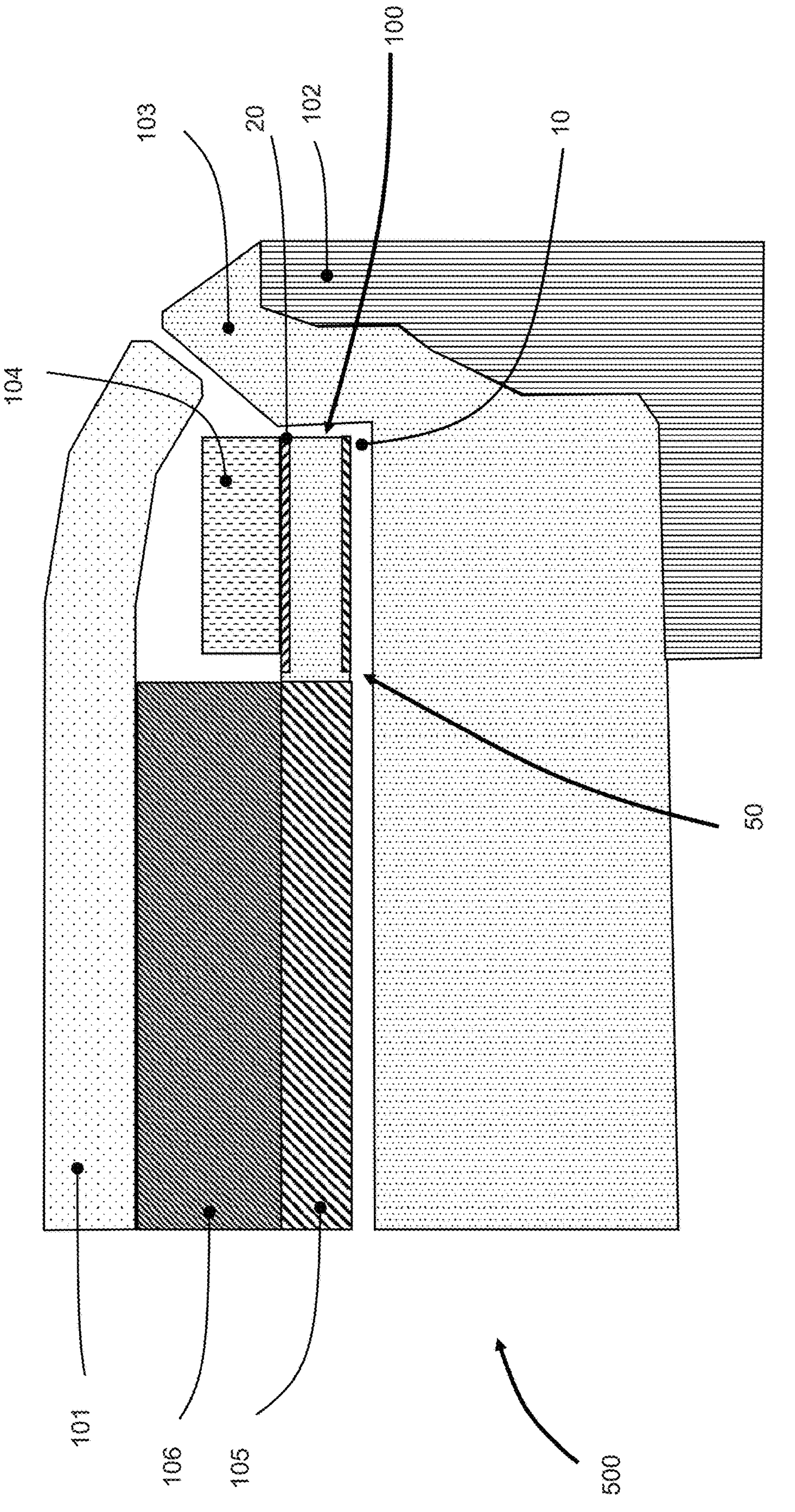
FIG. 9 is a partial side cross sectional view of an exemplary user equipment including an antenna assembly incorporating aspects of the disclosed embodiments.

Referring now to FIG. 9, which is a partial cross-sectional view of an exemplary user equipment (UE) 500, both the first antenna array 10 and the second antenna array 20 occupy the same volume 50. In this example, the substrate or PCB 105 is located under the display panel 106. The geometry, placement and arrangement of the respective elements of the first antenna array 10 and the second antenna array 20 relative to one another, as illustrated in FIG. 1, enables the first antenna array 10, which in this example, is a vertically polarized antenna, to be shared between both the first antenna array 10 and the second antenna array 20. The sharing of the geometry of the first antenna array 10 creates differential mode radiating currents on both the vertically polarized and horizontally polarized antenna arrays and improves the performance of the horizontally polarized antenna array.

Figure 5:
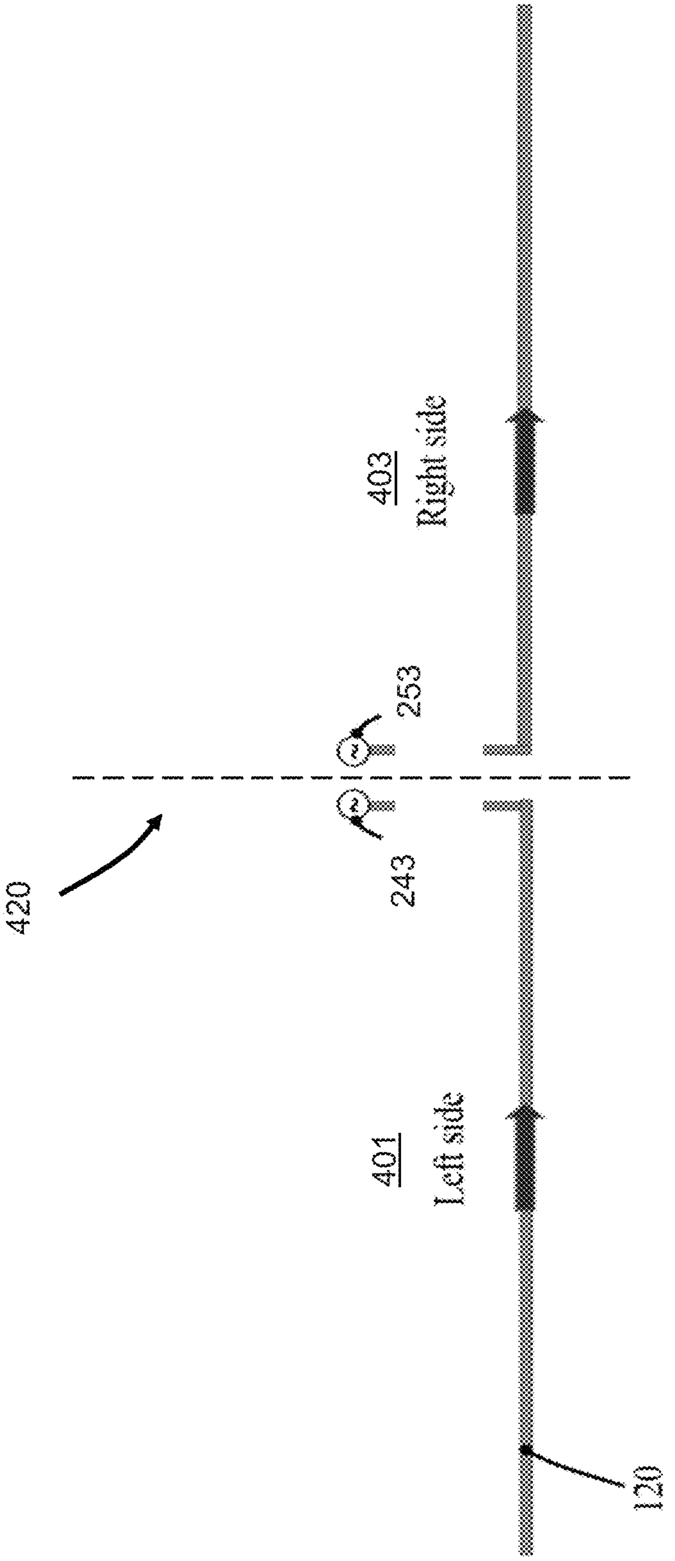
FIG. 5 illustrates an example of mirrored antenna feeds for an antenna assembly incorporating aspects of the disclosed embodiments.

FIGS. 4 and 5 illustrate two different examples configured to provide antenna feeding for the second, or horizontally polarized antenna array 20. In FIG. 4, there are mirrored feeds, represented as feed lines 213-243 and 253-283, disposed on either side 401, 403 of a centre-line 420 of the dipole-shaped coupler array 20. In the example of FIG. 4, the mechanical antenna geometry is mirrored with respect to the center line 420. This makes the antenna array 20 operate like one big dipole as presented in FIG. 5. Furthermore, this kind of mirrored antenna arrangement will improve the antenna isolation between the two polarizations of antenna arrays 10 and 20.

As illustrated in FIG. 5, this mirrored feeding scheme is implemented by having 180 degree phase difference between the left 401 and right 403 side feeding of the dipole-shaped coupler array 20. This feeding scheme excites two orthogonal modes, differential and common mode, and excellent isolation, for example, better than 40 dB, can be achieved. In the example of FIG. 1, the feeding scheme has similar phasing over the feeds.

Figure 6:
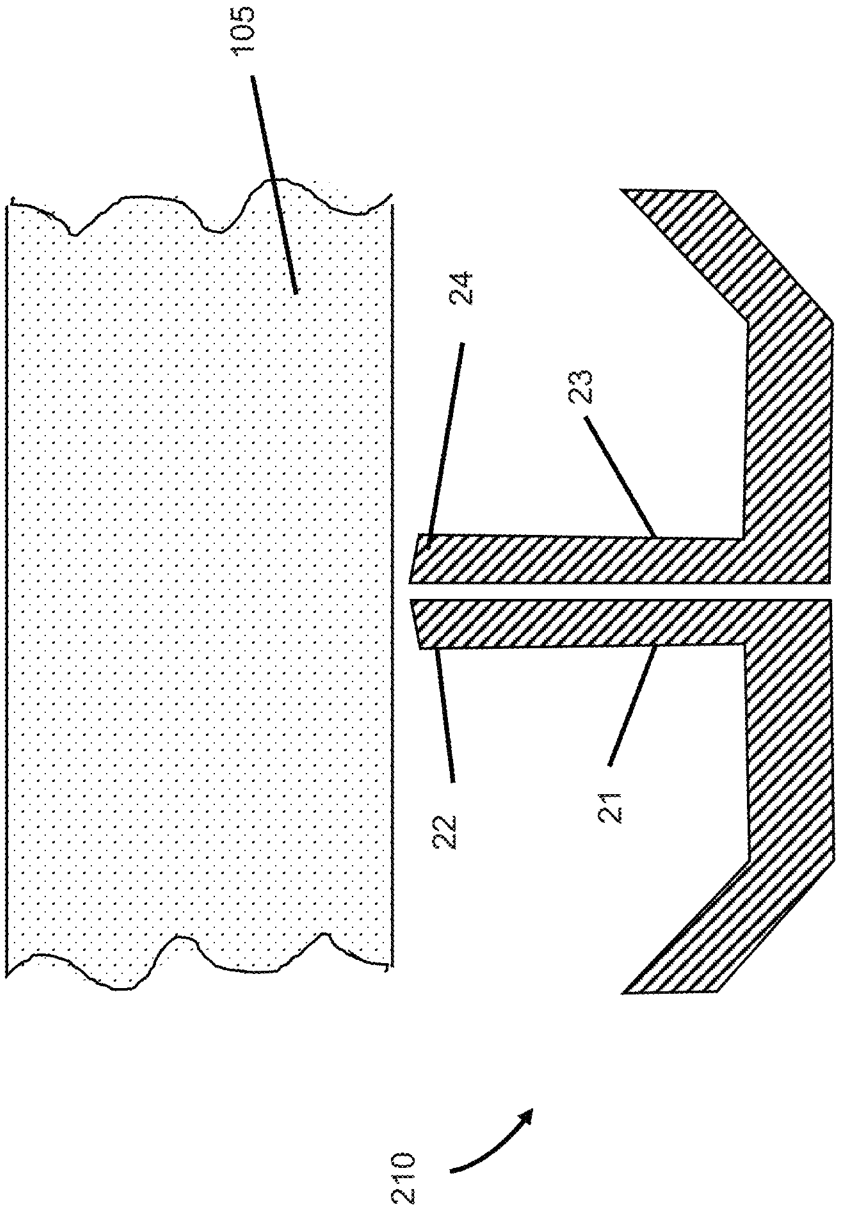
FIG. 6 illustrates a schematic block diagram of on embodiment of a feeding scheme for a dipole-shaped coupler antenna in an antenna assembly incorporating aspects of the disclosed embodiments.

FIG. 6 illustrates an example where the dipole shaped antenna coupler 210 has balanced feeding. In this example, one branch 21 of the dipole shaped antenna coupler 210 is connected to a first feed line 22. A second branch 23 of the dipole shaped antenna coupler 210 is connected to a second feed line 24. The feed lines 22 and 24 are feeding signals with the same magnitude and 180 degree phase offset.

Figure 7:
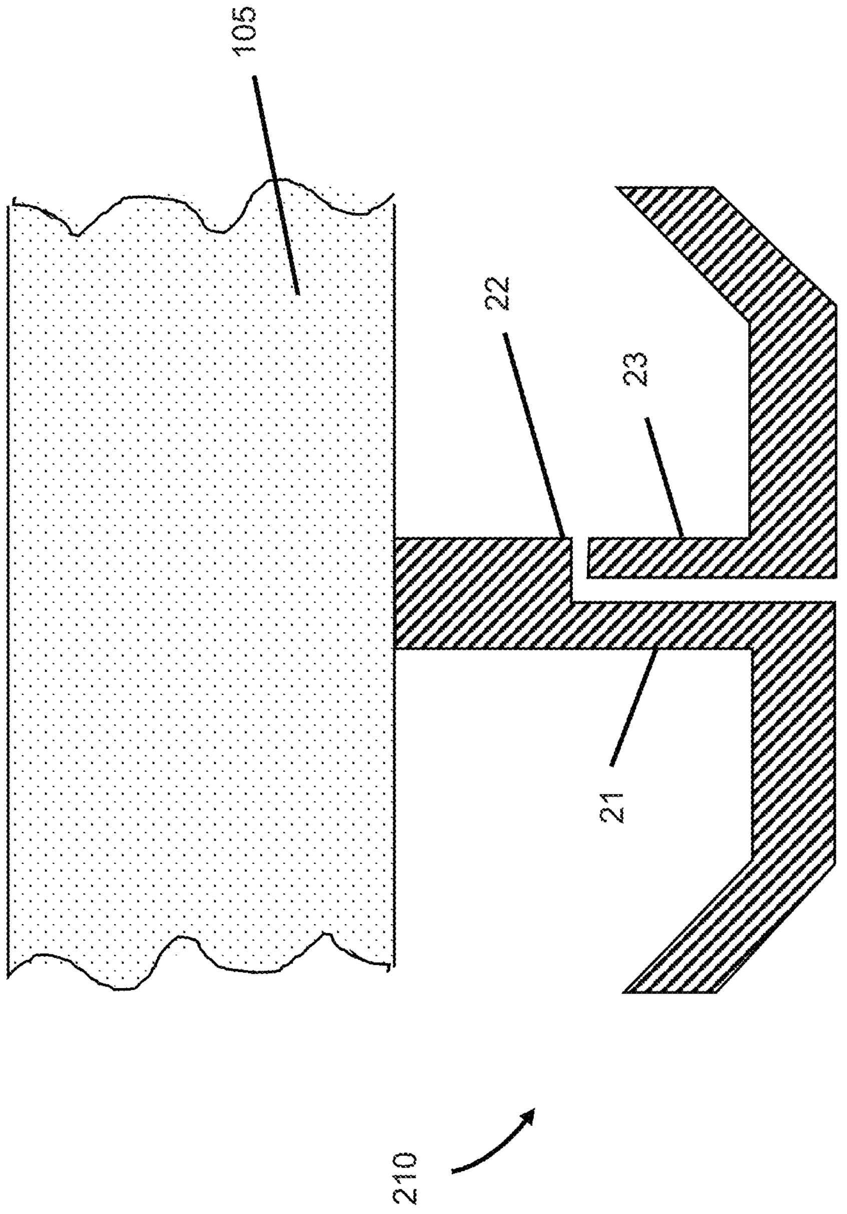
FIG. 7 illustrates a schematic block diagram of on embodiment of a feeding scheme for a dipole-shaped coupler antenna in an antenna assembly incorporating aspects of the disclosed embodiments.

FIG. 7 illustrates an example of unbalanced feeding of a dipole shaped antenna coupler 210. In this example, one branch 21 of the dipole shaped antenna coupler 210 is connected to a first feed line 22. The other branch 23 of the dipole shaped antenna coupler 120 is connected to a ground connection, typically a ground connection of the substrate 105.

Figure 8:
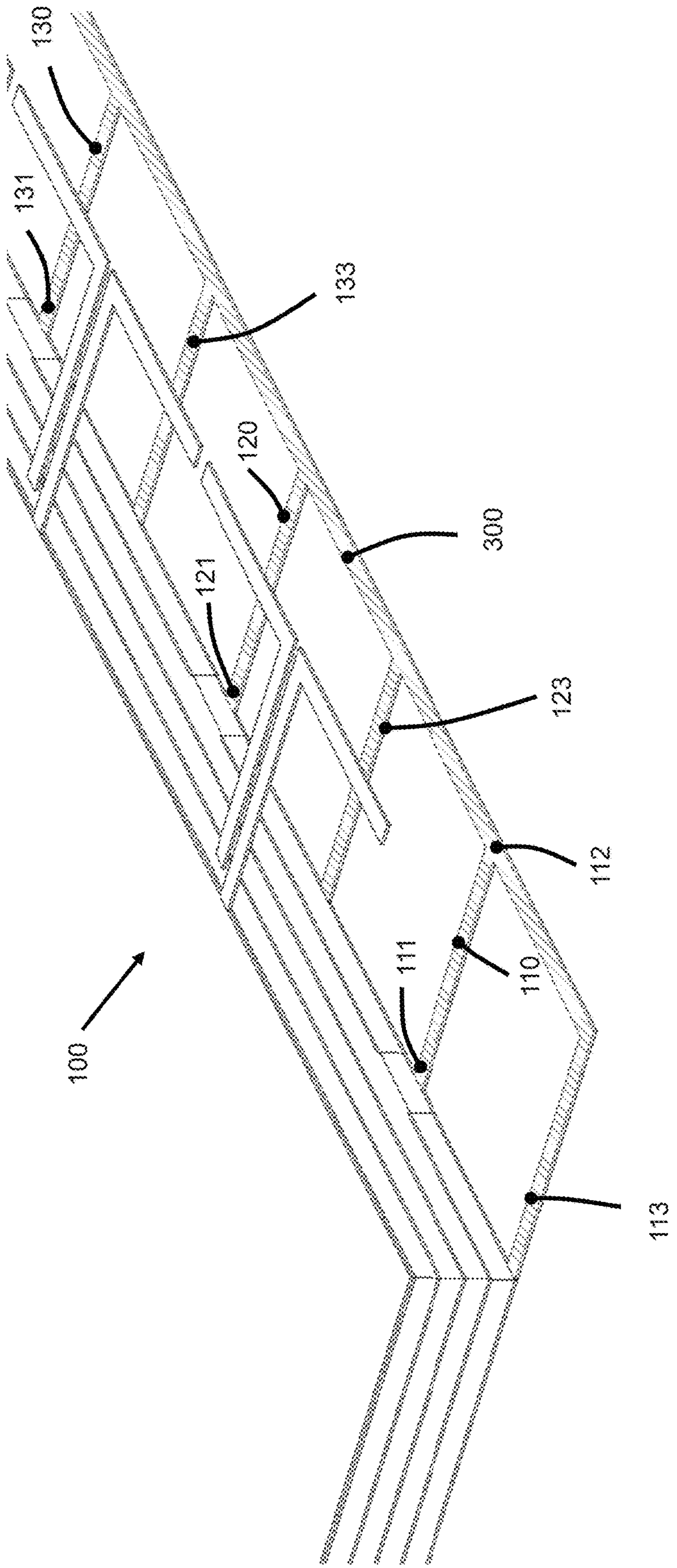
FIG. 8 illustrates a partial schematic block diagram of one embodiment of an exemplary antenna assembly incorporating aspects of the disclosed embodiments.

FIG. 8 illustrates an example of an antenna assembly 100 incorporating aspects of the disclosed embodiments where the monopole antenna array 10 is a multi-feed folded monopole antenna array. In this example, monopole antenna elements 110, 120 and 130 are illustrated, it being understood that the antenna assembly 100 can any number of monopole antenna elements greater than one. The number of monopole antenna elements will be equal to the number of dipole shaped antenna couplers.

In the example of FIG. 8, the monopole antenna element 110 includes a feed point 111 and a folded branch 113. The monopole antenna element 120 includes a feed point 121 and a folded branch 123. The monopole antenna element 130 includes a feed point 131 and a folded branch 133. Monopole antennas may have very low impedance level if located close to other metal objects or a ground plane. One way to increase the impedance of a monopole antenna is to introduce an additional branch(es). Increasing the number of branches increases the impedance level. The purpose of the folded branch is to increase the impedance of monopole elements.

FIG. 9 is a side partial cross-sectional view of a user equipment or device 500 incorporating aspects of the disclosed embodiments. In this example, the user equipment 500 is a mobile communication device. As shown in FIG. 9, an antenna assembly 100 incorporating aspects of the disclosed embodiments is disposed within the confines of the metal frame 102 of the device 500. In this example, the antenna assembly 100 includes a monopole antenna array 10 and a dipole shaped antenna coupler array 20 disposed with respect to the substrate 105, as is generally described herein with respect to any one or more of FIGS. 1-4 and 8. Co-existence of the antenna assembly 100 with the sub-6 GHz metal frame antenna 102 is provided by maintaining a dielectric-filled gap 103 between the antenna assembly 100 and the metal frame 102.

Figure 10:
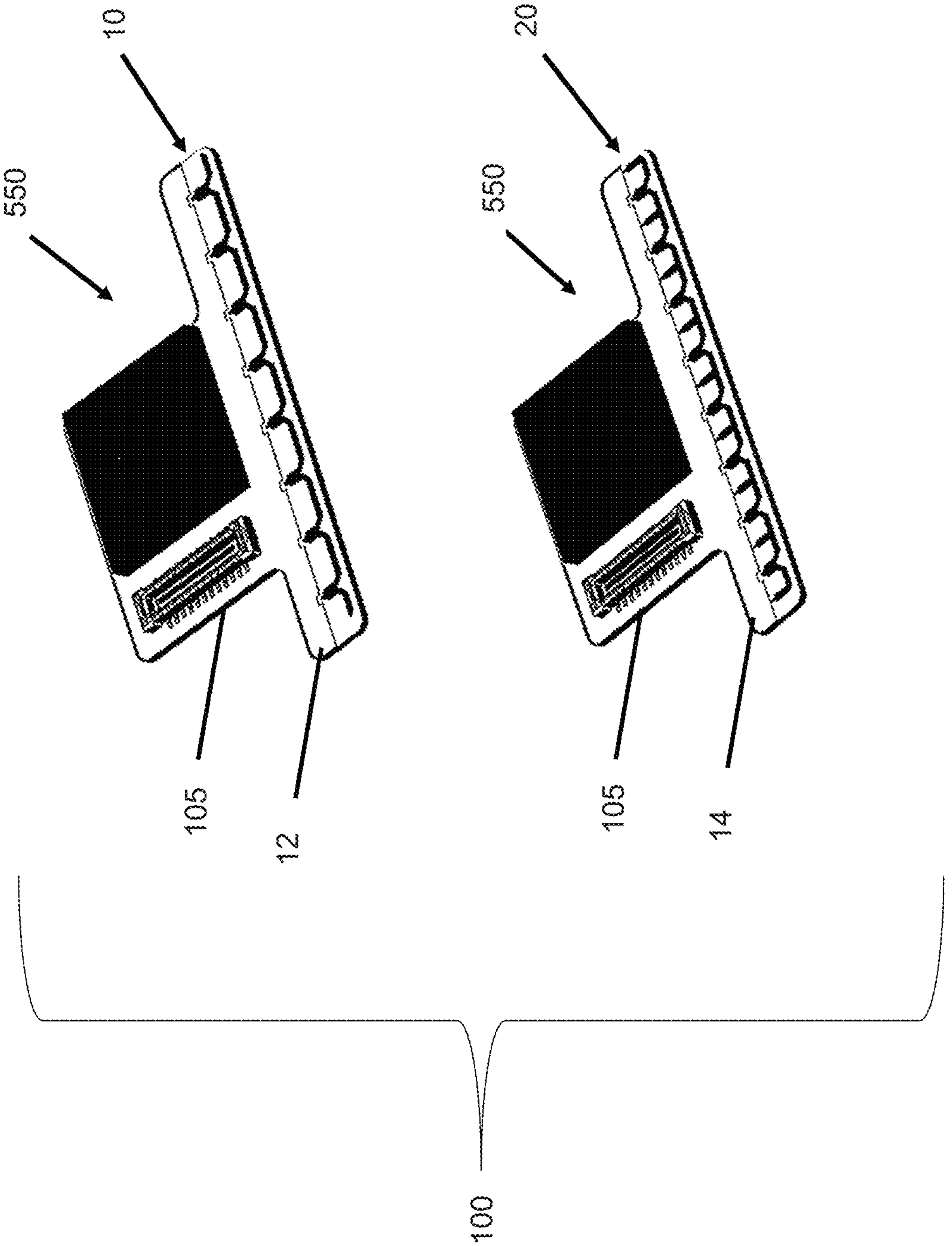
FIG. 10 illustrates an exemplary implantation of a Radio Frequency Integrated Circuit (RFIC) including an antenna assembly incorporating aspects of the disclosed embodiments.

In the example of FIG. 9, a dielectric block 104 is shown disposed in conjunction with the antenna assembly 100. In particular, the dielectric block is disposed over the second antenna array 20, which in this example, is the dipole shaped coupler array. In one embodiment, the dielectric constant Dk of the block 103 can be in the range of 5-30. The dielectric block 104 shown in FIG. 10 is optional, and its use will depend upon the implementation. As is shown in FIG. 9, the antenna assembly 100 can be disposed beneath a display glass 101 of the device 500. In this manner, dual polarization beamforming is focused toward the direction of the display glass 101. In this manner, when the user is holding the mobile communication device 500, the user's hand will not interfere with the antenna performance.

Figure 11:
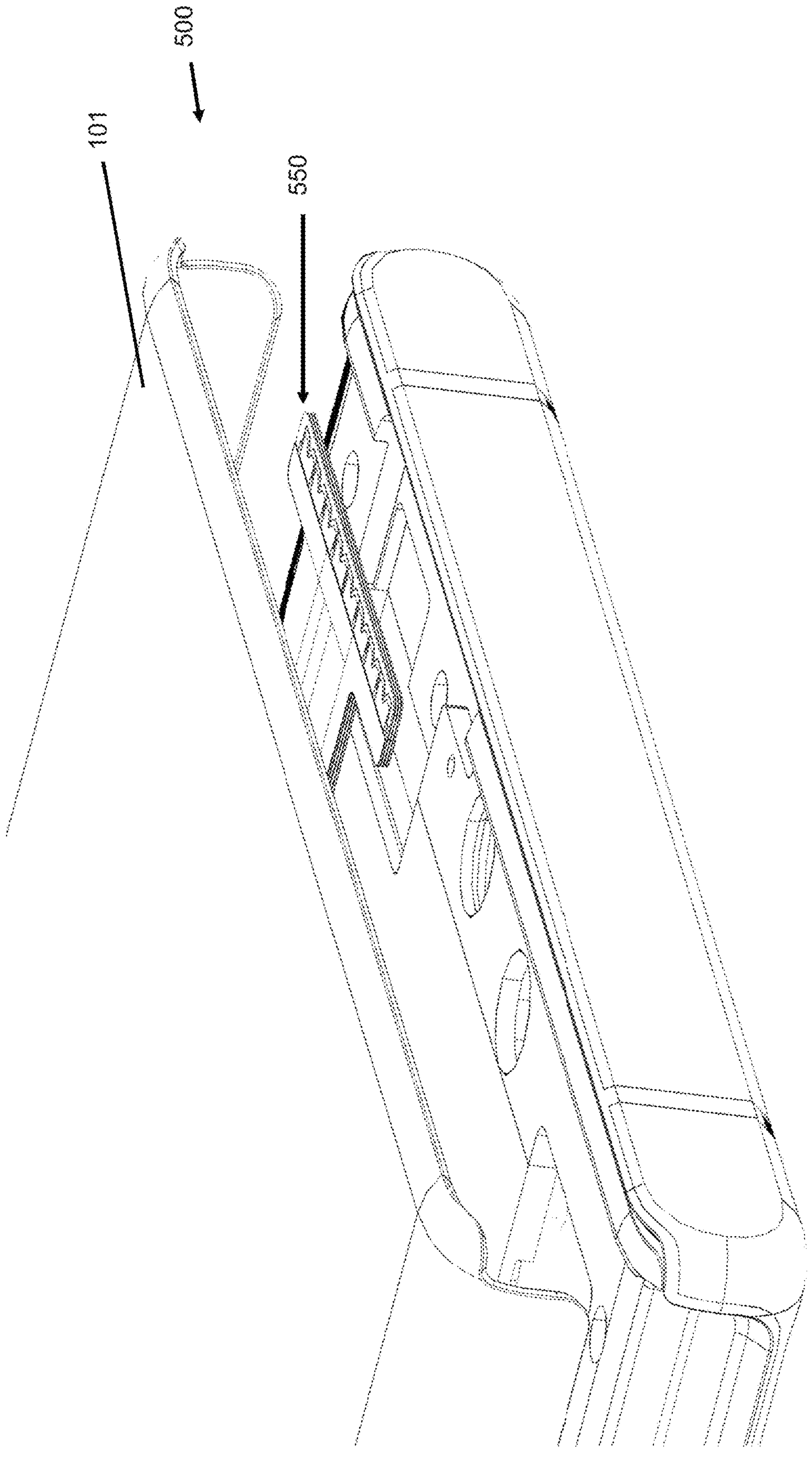
FIG. 11 illustrates an assembly end view of an exemplary user equipment including an RFIC with an antenna assembly incorporating aspects of the disclosed embodiments.

Referring to FIGS. 10 and 11, the antenna assembly 100 of the disclosed embodiments can be implemented in a Radio Frequency Integrated Circuit (RFIC) or chip 550. As shown in FIG. 11, the RFIC 550 can be configured to be disposed within an exemplary mobile communication device 500, below the display glass 101.

The aspects of the disclosed embodiments are directed to a dual-polarized connected antenna assembly that includes a monopole antenna array and a dipole shaped coupler antenna array. The monopole antenna array and the dipole shaped coupler antenna array are tightly coupled and occupy the same space or volume. The geometry of the monopole antenna array is shared with the dipole shaped coupler antenna array. The antenna assembly of the disclosed embodiments is configured to provide wide beam coverage with both vertical and horizontal polarization and can be implemented in a solid metal frame mobile device that includes a full display area.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An antenna assembly comprising:
- a first antenna array disposed on a first layer of a substrate, the first antenna array comprising a first monopole antenna element and at least one second monopole antenna element;
- a second antenna array disposed on a second layer of the substrate, the second antenna array comprising a first dipole shaped antenna coupler; and
- a metal strip coupled to the first monopole antenna element and to the at least one second monopole antenna element; and
- wherein the first antenna array and the second antenna array are spaced apart from each other and extend from a same sidewall of the substrate.

2. The antenna assembly according to claim 1, wherein the metal strip couples an end of the first monopole antenna element that is opposite to a feed point of the first monopole antenna element to an end of the at least one second monopole antenna element that is opposite to a feed point of the at least one second monopole antenna element.

3. The antenna assembly according to claim 1, wherein the metal strip is directly connected to the first monopole antenna element and the at least one second monopole antenna element.

4. The antenna assembly according to claim 1, wherein an end of the first monopole antenna element to which the metal strip is coupled and the metal strip are separated by a gap, and an end of the at least one second monopole antenna element to which the metal strip is coupled and the metal strip are separated by the gap.

5. The antenna assembly according to claim 4, wherein the metal strip is disposed on a third layer of the substrate, and the third layer is a different layer from the first layer and the second layer.

6. The antenna assembly according to claim 1, wherein an alignment of the first monopole antenna element and the at least one second monopole antenna element on the substrate is orthogonal relative to an alignment of the metal strip.

7. The antenna assembly according to claim 1, wherein a distance between the first antenna array and the second antenna array is less than two millimeters (mm).

8. The antenna assembly according to claim 1, further comprising a dielectric block disposed over the second antenna array.

9. The antenna assembly according to claim 1, wherein the second antenna array comprises a second dipole shaped antenna coupler, the second dipole shaped antenna coupler being coupled with the first dipole shaped antenna coupler.

10. The antenna assembly according to claim 1, wherein a first branch of the first dipole shaped antenna coupler is connected to a first feeding line and a second branch of the first dipole shaped antenna coupler is connected to a second feeding line.

11. The antenna assembly according to claim 1, wherein a first branch of the first dipole shaped antenna coupler is connected to a feeding line and a second branch of the first dipole shaped antenna coupler is connected to a ground connection.

12. The antenna assembly according to claim 1, wherein a polarization of the first antenna array is different from a polarization of the second antenna array.

13. The antenna assembly according to claim 1, wherein the first antenna array is configured as vertically polarized antenna and the second antenna array is configured as a horizontally polarized antenna.

14. A mobile communication device comprising:
- a frame member;
- a display glass member covering a display of the mobile communication device; and
- an antenna assembly,
- wherein the antenna assembly comprises:
  - a first antenna array disposed on a first layer of a substrate, the first antenna array comprising a first monopole antenna element and at least one second monopole antenna element;

a second antenna array disposed on a second layer of the substrate, the second antenna array comprising a first dipole shaped antenna coupler; and a metal strip coupled to the first monopole antenna element and to the at least one second monopole antenna element; and wherein the first antenna array and the second antenna array are spaced apart and extend from a same sidewall of the substrate.

15. The mobile communication device according to claim 14, wherein the antenna assembly is disposed in a cavity defined between the display glass member and the frame member.

16. The mobile communication device according to claim 14, wherein the metal strip couples an end of the first monopole antenna element that is opposite to a feed point of the first monopole antenna element to an end of the at least one second monopole antenna element that is opposite to a feed point of the at least one second monopole antenna element.

17. The mobile communication device according to claim 14, wherein a distance between the first antenna array and the second antenna array is less than two millimeters (mm).

18. The mobile communication device according to claim 14, wherein a first branch of the first dipole shaped antenna coupler is connected to a first feeding line and a second branch of the first dipole shaped antenna coupler is connected to a second feeding line.

19. The mobile communication device according to claim 14, wherein a first branch of the first dipole shaped antenna coupler is connected to a feeding line and a second branch of the first dipole shaped antenna coupler is connected to a ground connection.

20. The mobile communication device according to claim 14, wherein a polarization of the first antenna array is different from a polarization of the second antenna array.

* * * * *